United States Patent
Yoshino (10) Patent No.: US 8,062,449 B2
(45) Date of Patent: Nov. 22, 2011

(54) METHOD FOR MANUFACTURING OPTICAL SURFACE MOUNTING WAVEGUIDE SUBSTRATE

(75) Inventor: Takashi Yoshino, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/556,889

(22) Filed: Sep. 10, 2009

(65) Prior Publication Data
US 2010/0000664 A1    Jan. 7, 2010

Related U.S. Application Data (63) Continuation of application No. PCT/JP2008/055160, filed on Mar. 13, 2008.

(30) Foreign Application Priority Data

Mar. 22, 2007    (JP) ................................. 2007-074578

(51) Int. Cl.
B32B 37/00    (2006.01)
(52) U.S. Cl. ........................................ 156/154; 156/257
(58) Field of Classification Search ........................ None
See application file for complete search history.

(56) References Cited

U.S. PATENT DOCUMENTS

| | | | |
|---|---|---|---|
| 4,163,953 | A | 8/1979 | Springthorpe et al. |
| 2002/0196997 | A1 | 12/2002 | Chakravorty et al. |
| 2003/0002770 | A1 | 1/2003 | Chakravorty et al. |

FOREIGN PATENT DOCUMENTS

| | | |
|---|---|---|
| JP | 05-034526 A1 | 2/1993 |
| JP | 05-072429 A1 | 3/1993 |
| JP | 07-183570 A1 | 7/1995 |
| JP | 2004-094070 A1 | 3/2004 |
| JP | 2004-258065 A1 | 9/2004 |
| JP | 2004-258066 A1 | 9/2004 |
| JP | 2005-070141 A1 | 3/2005 |
| JP | 2006-251046 A1 | 9/2006 |

*Primary Examiner* — Jeff Aftergut
(74) *Attorney, Agent, or Firm* — Burr & Brown (57) ABSTRACT

A cladding layer 7 is formed on a base body made of a material for an optical waveguide, and a groove is formed in the base body and the cladding layer 7. The base body and the cladding layer are joined to a supporting substrate with the cladding layer 7 positioned on the side of the supporting substrate 1. The base body is machined and thinned to form a thin plate 30 so that the groove penetrates through the thin plate 30. An end face 14A on the groove 12 side of the optical waveguide 13A is contacted with a light absorbing material or light reflecting material 9 to form a reflecting mirror.

8 Claims, 8 Drawing Sheets

METHOD FOR MANUFACTURING OPTICAL SURFACE MOUNTING WAVEGUIDE SUBSTRATE

FIELD OF THE INVENTION

The present invention relates to a method for manufacturing an optical surface mounting waveguide substrate.

BACKGROUND OF THE INVENTION

In recent years, with the developments in information communication apparatus, shortage of the capacity of signal lines within such apparatus becomes problematic. For solving the problem, the replacement of a part of electric wiring made of copper in the printed circuit board within the apparatus by an optical waveguide and the use of optical signals in place of electric signals come under review. Since high-density optical wiring is required to be housed in a limited space, the following is examined in the apparatus. That is, in the same manner as in ICs and multi-chip modules, a photoelectric element such as a laser diode or photodiode is mounted on a surface of a substrate, and optical wiring layers are stacked on the same substrate as the electric wiring substrate. Such optical surface mounting circuit substrate is disclosed in, for example, Japanese Patent Publication Nos. H05-72429A and 2004-94070A.

In an optical-electrical wiring substrate in which an optical waveguide is stacked on the same substrate as an electric wiring, high-density mounting can be achieved. However, in order that an optical waveguide may be optically connected to a photoelectric element such as a laser diode or photodiode, an optical path switching technology for switching an optical path of the optical waveguide by an angle of 90 degrees is required.

Figure 1:
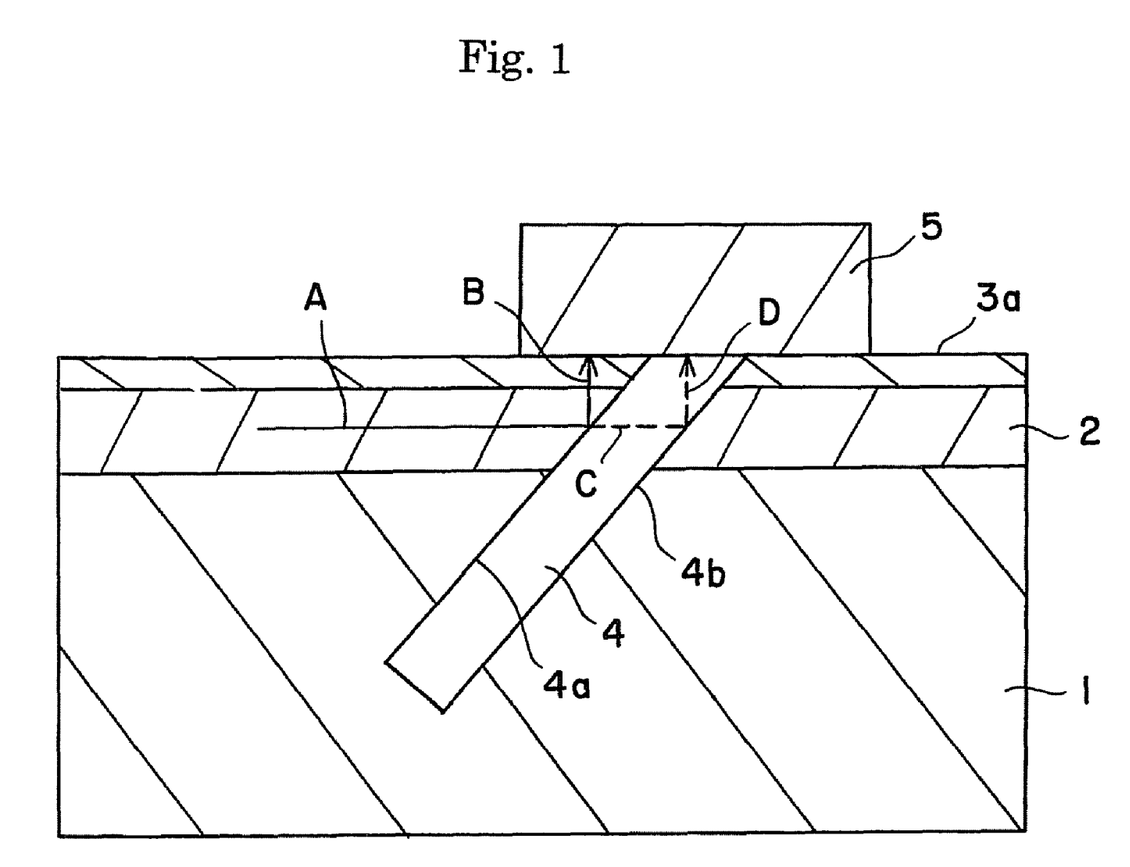
FIG. 1 is a sectional view illustrating an optical surface mounting waveguide substrate of a conventional example.

In Japanese Patent Publication No. H05-34526A, for example, as illustrated in FIG. 1, a groove 4 extending toward an inner side from a surface 3a is formed in a substrate having formed therein an optical waveguide 2 by machining and etching. This groove 4 is made oblique by 45 degrees relative to the substrate surface 3a. As a result, an end face of the optical waveguide 2 faces the groove 4, and an optical reflecting mirror is formed on the end face of the optical waveguide 2. Light A propagating through the optical waveguide 2 is reflected by a wall surface 4a of the groove 4, namely, by the optical reflecting mirror, and propagates toward the surface 3a of the substrate to enter a photoelectric element 5 on the substrate surface.

SUMMARY OF THE INVENTION

However, in such a reflecting mirror, since an optical reflectance of the reflecting mirror is determined by a refractive index of an optical waveguide, a significant amount of light enters a void 4 as indicated an arrow C, goes straight on, is reflected by the other wall surface 4b of the void 4, goes upward, and enters an element 5. The amount of incident light as indicated by this arrow C is determined by an effective refractive index of the optical waveguide, and therefore, fails to be reduced above a certain level. Accordingly, it is inevitable that a significant amount of light enters the element 5 via a path different from a target, as indicated by an arrow D. As a result, an optical signal having a time lag enters the element 5 as indicated by the arrow D, and the delayed signal is superimposed on a genuine signal, which causes noise.

An object of the present invention is to provide a method for eliminating noise due to multiple reflection of light that transmits a reflecting mirror and for enhancing productivity when manufacturing the reflecting mirror of an optical surface mounting circuit substrate.

The present invention provides a method comprising:
a cladding layer forming step for providing a cladding layer on a base body comprising a material for an optical waveguide;
a groove forming step for forming a groove in the base body and the cladding layer;
a bonding step for bonding the base body and the cladding layer to a supporting substrate wherein the cladding layer is positioned on the side of the supporting substrate; and
a thinning step for machining and thinning the base body to form a thin plate so that the groove penetrates through the thin plate,
wherein an end face on the groove side of the optical waveguide is contacted with a light absorbing material or light reflecting material to form a reflecting mirror.

According to the present invention, the groove is formed in the base body and the cladding layer, and subsequently, the base body and the cladding layer are bonded to the supporting substrate. The base body is thinned by machining to form the optical waveguide, and at the same time, the groove is allowed to penetrate through the thin plate. Further, an end face on the groove side of the optical waveguide is contacted with a light absorbing material or light reflecting material to thereby form a reflecting mirror. Specifically, the groove is not used as the reflecting mirror as it is, and after forming the groove in the base body once, the base body is adhered to the supporting substrate, and the base body is thinned by machining from the side opposite to the groove to form the thin plate. At the same time, the groove is allowed to penetrate through the thin plate, thereby forming the reflecting mirror on the wall surface of the groove.

According to the above-described method, the reflecting mirror can be easily formed with high productivity. In addition, since the multiple reflection due to the transmitted light transmitting the reflecting mirror can be prevented, whereby noise in the photoelectric element can be prevented.

DETAILED DESCRIPTION OF THE INVENTION

The present invention will be described in more detail below with reference to the accompanying drawings.

Figure 2:
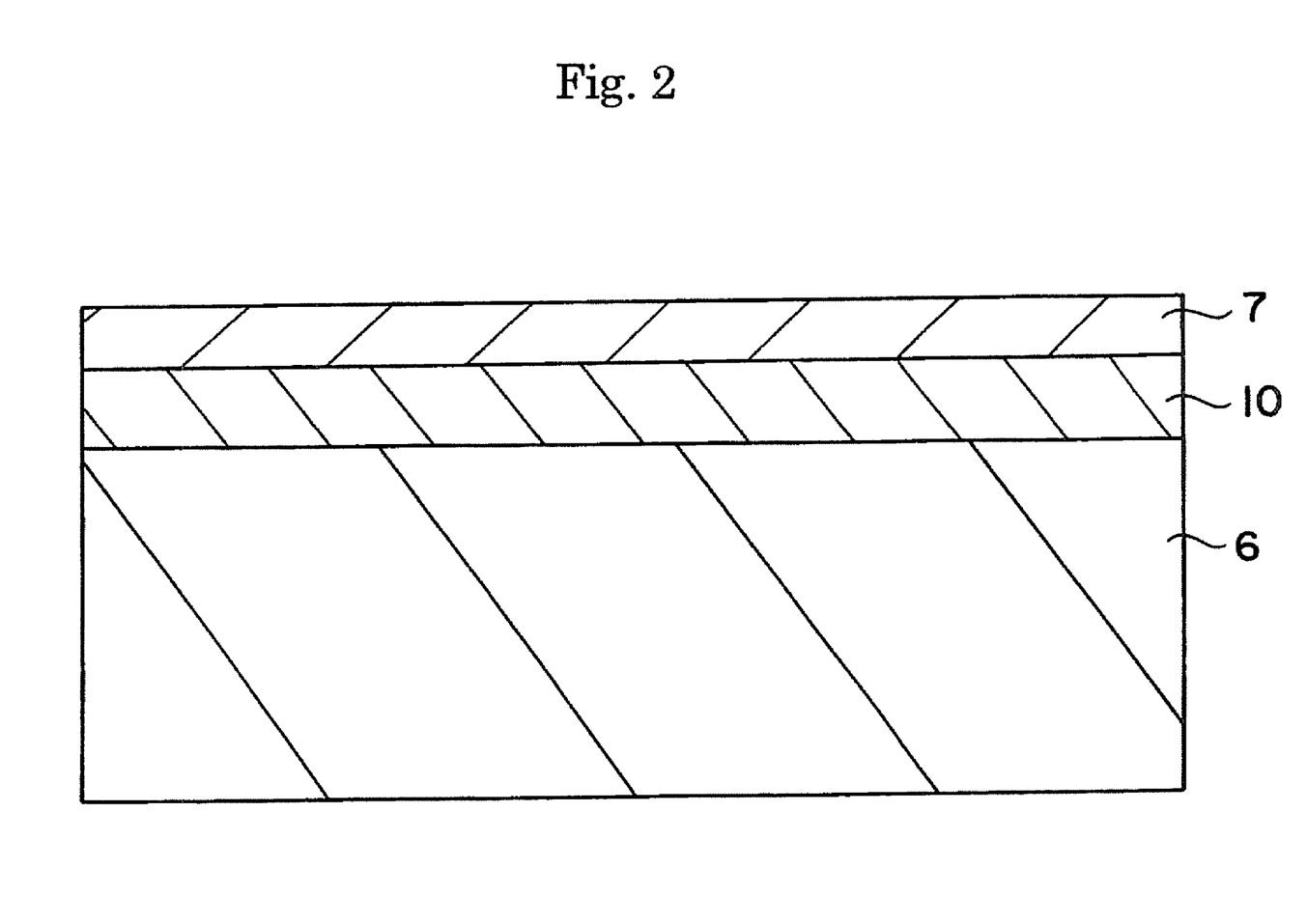
FIG. 2 is a sectional view illustrating a state in which an optical waveguide 10 and a cladding layer 7 are formed on a base body 6.

In the present invention, a cladding layer is first formed on a base body made of a material of an optical waveguide (cladding layer formation process). In an example of FIG. 2, for example, a cladding layer 7 is formed on the base body 6. At this time, an optical waveguide 10 can be formed in the base body 6. As a method for forming the optical waveguide, a diffusion method such as a titanium diffusion process and a proton exchange process may be used. Alternatively, the optical waveguide is not formed at this stage, but may be formed by the after-mentioned thinning processing. Further, after producing the thin plate, the optical waveguide may be formed within the thin plate.

The kind of a material constituting an optical waveguide substrate are not limited; but lithium niobate ($LiNbO_3$), lithium tantalate ($LiTaO_3$), lithium niobate-lithium tantalate solid solution, or $K_3Li_2Nb_5O_{15}$ single crystal can be particularly preferably exemplified.

In order to further enhance the optical damage resistance of a three-dimensional optical waveguide, one or more metallic element(s) selected from the group consisting of magnesium (Mg), zinc (Zn), scandium (Sc) and indium (In) can be contained in a ferroelectric single crystal, and magnesium is particularly preferable. From the viewpoint of the fact that polarization inversion characteristics (conditions) are clear, magnesium is particularly preferably added to a lithium niobate single crystal, a lithium niobate-lithium tantalate solid solution single crystal, and a lithium tantalate single crystal, respectively. A rare earth element can be contained as a dopant in the ferroelectric single crystal. This rare earth element acts as an additive element for laser oscillation. As the rare earth element, Nd, Er, Tm, Ho, Dy and Pr are particularly preferable.

As the materials for the cladding layer, $SiO_2$, $Ta_2O_5$, and $Al_2O_3$ may be exemplified.

Next, a groove is formed in the base body and the cladding layer. In this stage, a shape of the groove is not limited. However, it is preferable that the shape of the groove is suitable for contacting a light absorbing material or light reflecting material with at least a wall surface facing the groove. From the above-described viewpoint, the groove preferably has a first inclined plane that inclines to one direction from a vertical surface and a second inclined plane that inclines to a direction opposite to that of the first inclined plane from a vertical surface.

Figure 3:
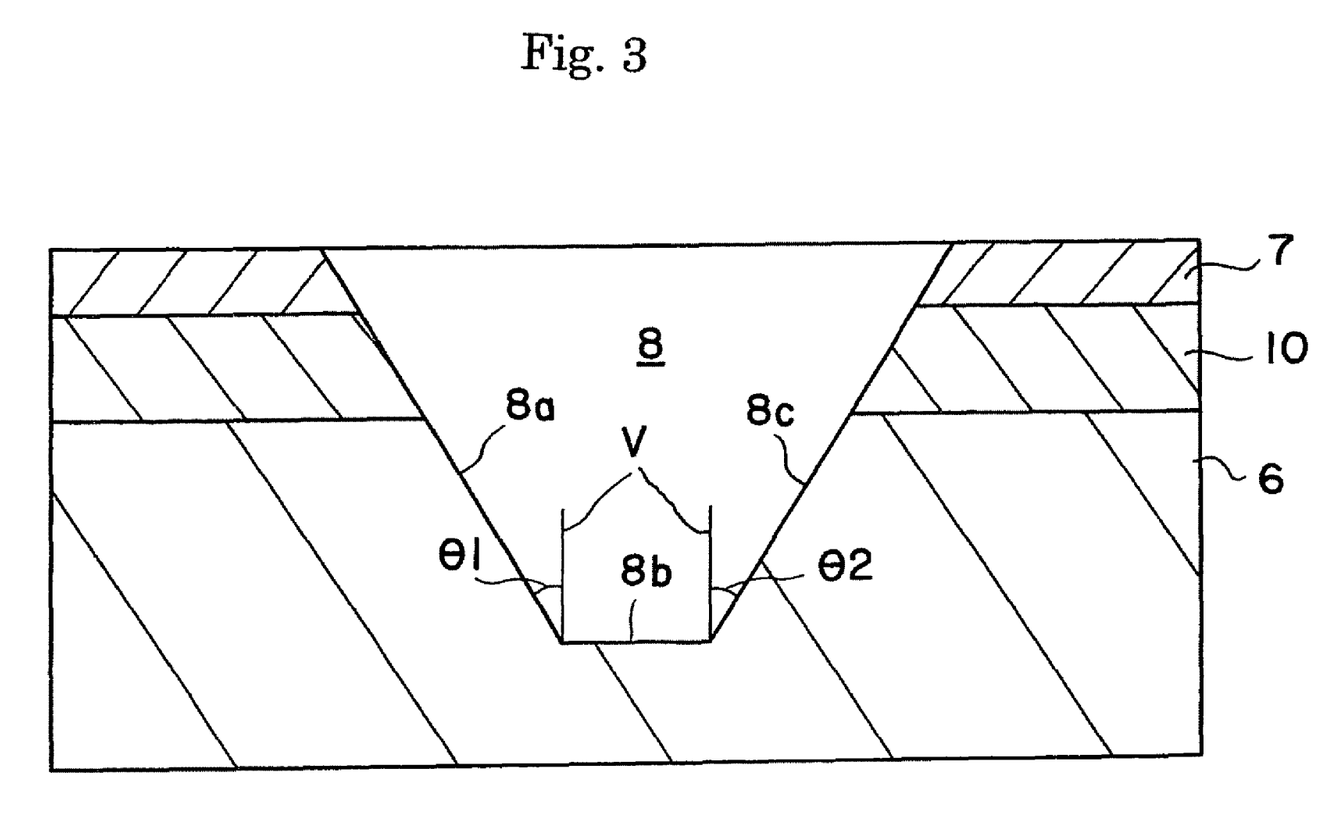
FIG. 3 is a sectional view illustrating a state in which a groove 8 is formed in the base body of FIG. 2.

For example, in an example of FIG. 3, the groove 8 is formed in the cladding layer 7 and the substrate 6. The groove 8 has a first inclined plane 8a that inclines to one direction from a vertical surface V and a second inclined plane 8c that inclines to a direction opposite to that of the first inclined plane 8a from the vertical surface V. In the example, a flat bottom surface 8b is formed between the inclined planes 8a and 8c. By adopting the above-described shape, the light absorbing material or light reflecting material can be easily contacted with the respective inclined planes. Specifically, a film made of these materials may be relatively easily formed, or the groove may be relatively easily filled with these materials.

From the above-described viewpoint, respective angles θ1 and θ2 formed between the vertical surface V and the respective inclined planes 8a and 8c are preferably from 20 to 70 degrees, and more preferably from 30 to 60 degrees. The method for forming the groove is not particularly limited, but wet etching, dry etching, ion milling, laser abrasion and grinding can be exemplified.

Figure 4:
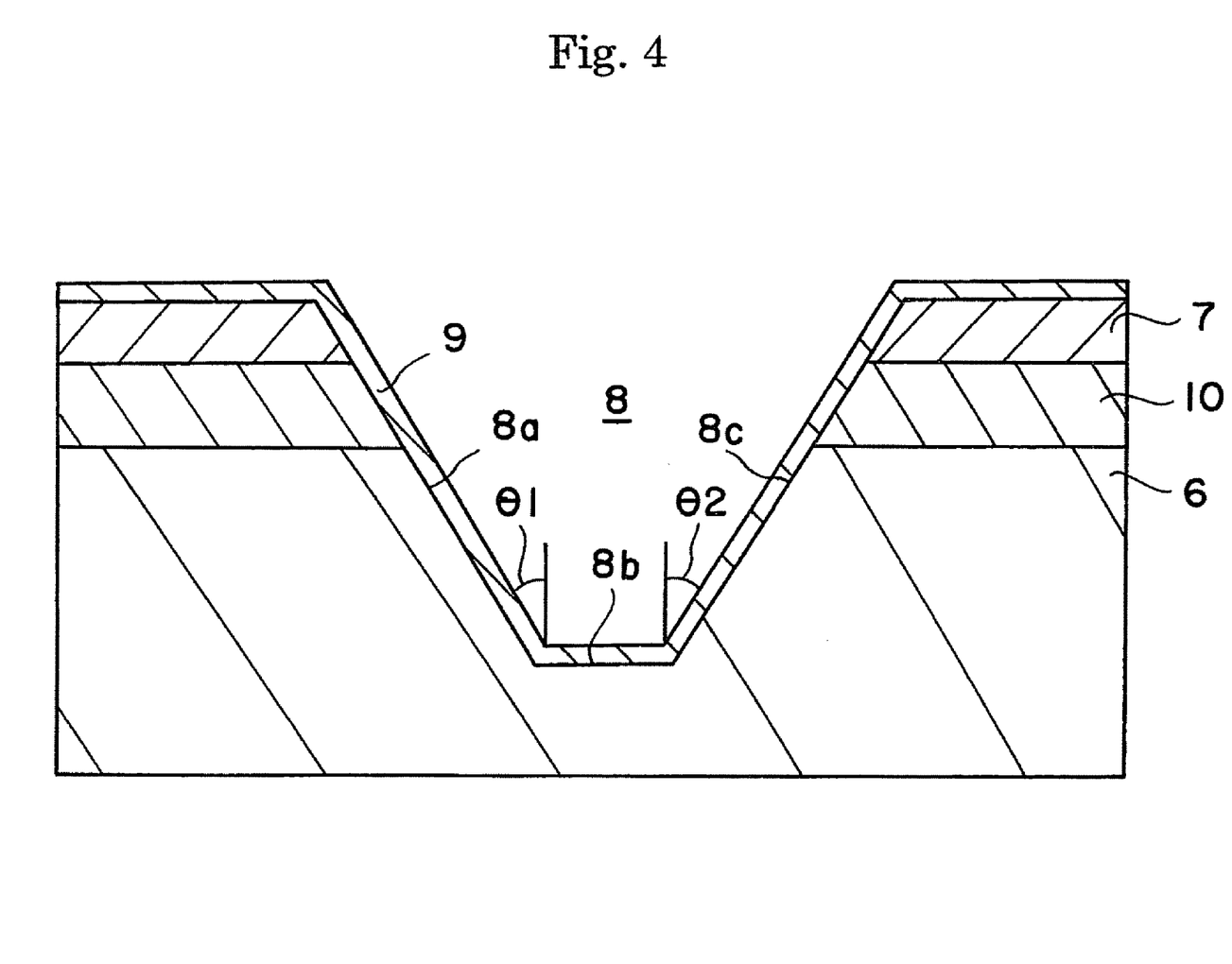
FIG. 4 is a sectional view illustrating a state in which a film 9 made of a light absorbing material or light reflecting material is formed on a wall surface facing the groove 8.

Next, the film made of the light absorbing material or the light reflecting material can be formed on the wall surface of the groove. For example, as illustrated in FIG. 4, the film 9 can be formed so as to cover the inclined planes 8a and 8c and bottom surface 8b facing the groove 8. The method of forming the film is not particularly limited, but a chemical vapor deposition method, a sputtering method, and a vacuum deposition method can be exemplified.

Next, the base body and the cladding layer are bonded to the supporting substrate, and then, the cladding layer is positioned on the side of the supporting substrate. For example, in an example of FIG. 5, the base body 6 and the cladding layer 7 are bonded to the supporting substrate 1. A bonding layer is not illustrated in the drawing. At this time, the cladding layer 7 is required to be positioned on the side of the supporting substrate 1.

The material of the supporting substrate is required to have high insulation properties, uniform volume resistivity in the material, and predetermined mechanical strength. As the above-described material, silicon, sapphire, quartz and glass can be exemplified.

The method for bonding the base body and the supporting substrate is not particularly limited. When bonding both of the base body and the supporting substrate, the material of the adhesive is not particularly limited, but ultraviolet curing, thermosetting, and combined type, such as acrylic or epoxy resin can be exemplified.

Figure 6:
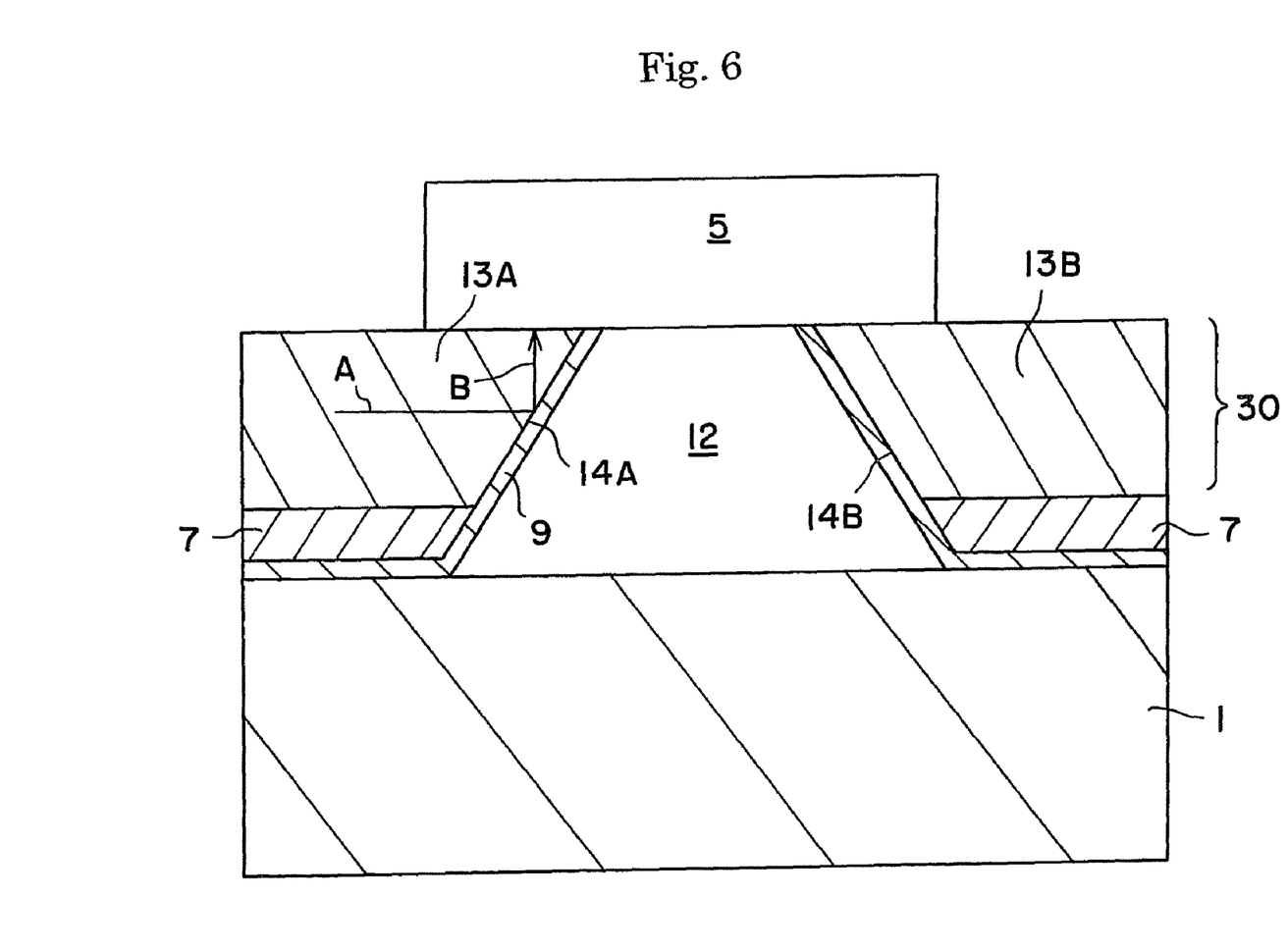
FIG. 6 is a sectional view illustrating a state in which the base body of FIG. 5 is thinned by machining.

Next, the base body is thinned by machining to form a thin plate. For example, as illustrated in FIG. 6, the base body is thinned by machining to form a thin plate 30. In the example, the optical waveguide is formed at the stage of the base body, and this optical waveguide remains within the thin plate to form slab-type optical waveguides 13A and 13B. This slab-type optical waveguide may be further ridged to form a channel-type optical waveguide.

When the base body is thinned in such a way, the groove is allowed to penetrate through the back side of the substrate, thereby forming a through-groove 12, for example, as illustrated in FIG. 6. Respective end surfaces 14A and 14B of the optical waveguides 13A and 13B are covered by the films 9 made of the light absorbing material or the light reflecting material, and the respective films 9 are exposed to a recessed section 12.

At a suitable portion on the optical waveguides 13A and 13B, a photoelectric element is placed so as to cover this groove 12. Light propagating through the optical waveguide 13A as indicated by the arrow A is, for example, reflected by the reflecting surface 14A to turn an optical path upward as indicated by the arrow B, thereby entering the upper photoelectric element 5.

Figure 7:
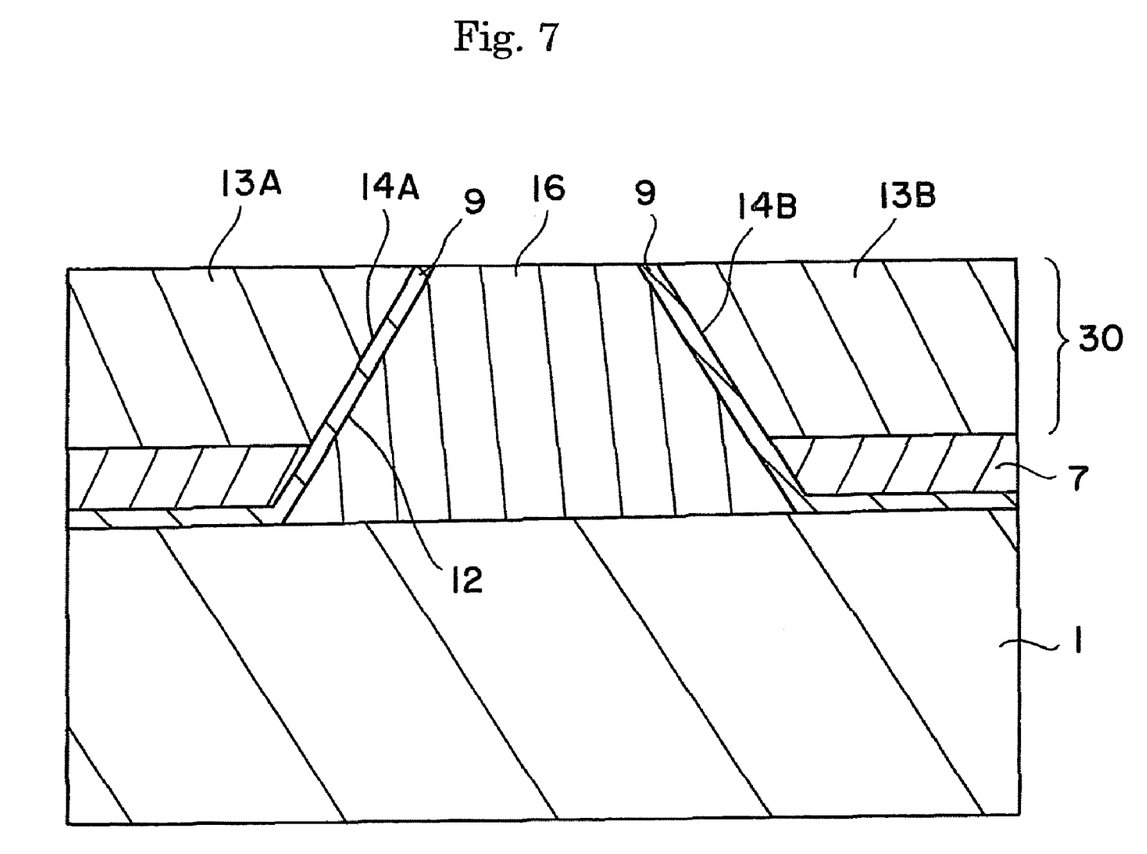
FIG. 7 is a sectional view illustrating a state in which a groove 12 is filled with a low dielectric constant material 16.

Further, the recessed section 12 may be filled with a low dielectric constant material. For example, in an example of FIG. 7, the groove 12 is filled with a low dielectric constant material 16, and also the above-described films 9 are formed. In order to fabricate the above-described device, the recessed section 8 is filled with the low dielectric constant material 16 at the stage of FIG. 4.

As the low dielectric constant material, an organic resin material such as polyimide, and inorganic glass can be exemplified.

Figure 8:
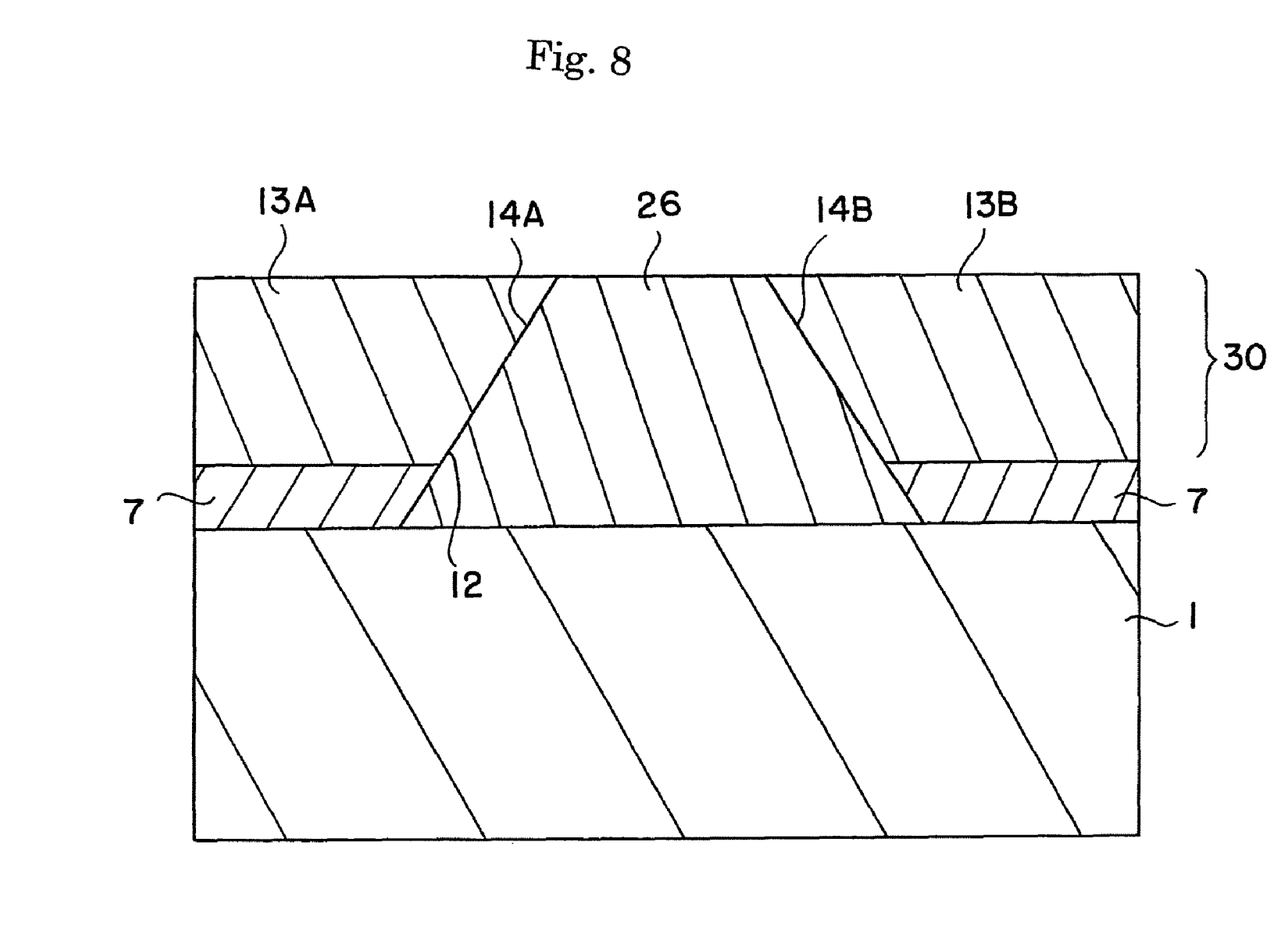
FIG. 8 is a sectional view illustrating a state in which the groove 12 is filled with a light absorbing material or light reflecting material 26.

Meanwhile, in an example of FIG. 8, the groove 12 is filled with a light absorbing material or a light reflecting material 26, and the above-described film 9 is not formed. In order to fabricate the above-described device, at the stage of FIG. 3, the recessed section 8 is filled with the light absorbing material or the light reflecting material, and the formation process for the film 9 is not performed.

As the light reflecting material, the following can be exemplified: that is, metallic films of Au, Ag, Cu, Al, Cr, Rh, Pt, Ti and Si; dielectric films of $SiO_2$, SiN, $Al_2O_3$, $TiO_2$ and $Ta_2O_5$;

a combination of the metallic films and the dielectric films; and a dielectric multi-layered film.

As the light absorbing material, polyimide, resist, and metal-doped glass can be exemplified.

When the photoelectric element is mounted on the optical waveguide within the substrate according to the present invention, optical signals can be connected to the optical waveguide in a state of being confined within an optical path switching component. In addition, in the above-described respective examples, an optical path switching angle of 90 degrees is adopted; but the optical path switching angle can be arbitrarily set.

As the above-described photoelectric element, a photodiode can be exemplified.

EXAMPLES

According to the method illustrated with reference to FIGS. 2 to 6, the device of FIG. 6 was manufactured. Specifically, an X-cut substrate made of a lithium niobate single crystal of 0.5 mm thick was used as the base body 6. The optical waveguide 10 of 6 μm width and 5 μm depth was produced on the base body 6 using the Ti diffusion method. Next, by the sputtering method, the $SiO_2$ cladding layer 7 of 1 μm thickness was formed on a surface on which the optical waveguide 10 is formed. Subsequently, as illustrated in FIG. 3, in the substrate surface formed the groove 8 with a width of 50 μm, a depth of 20 μm and inclination angles θ1 and θ2 of 45 degrees using a dicer. After forming the groove, the aluminum film 9 was formed by the sputtering method as illustrated in FIG. 4.

Figure 5:
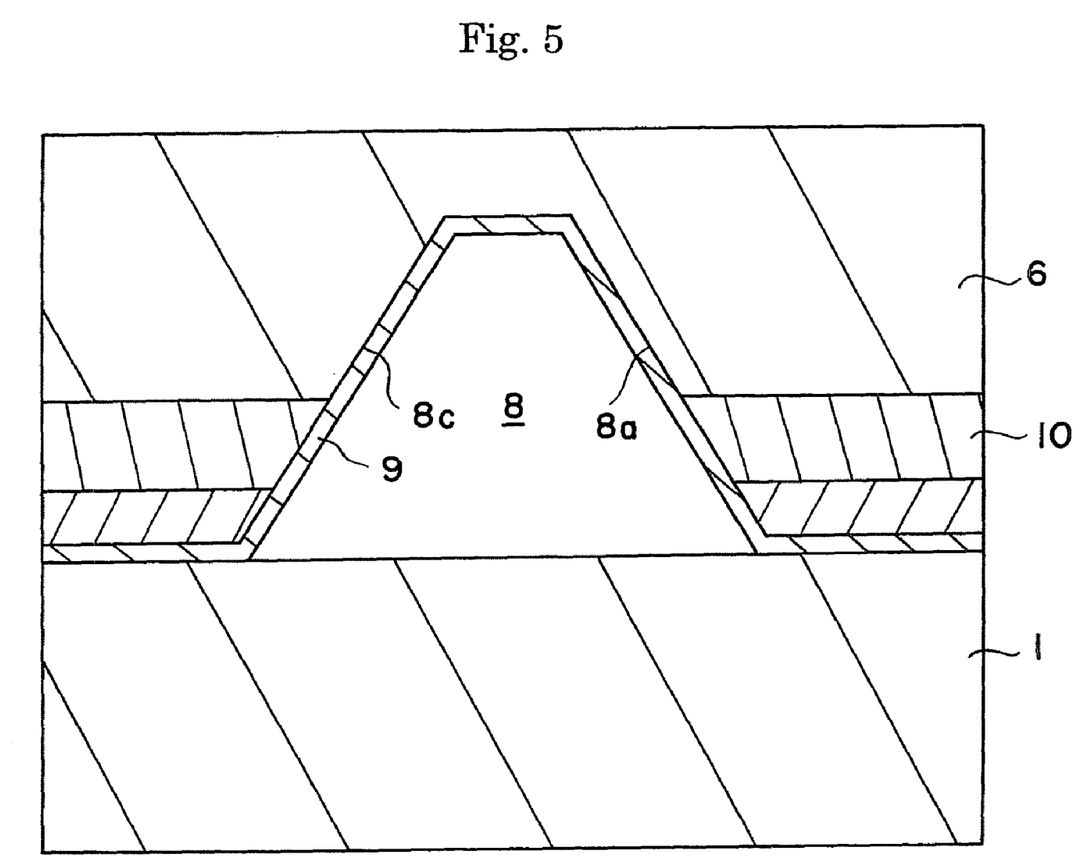
FIG. 5 is a sectional view illustrating a state in which the base body of FIG. 4 is bonded to a supporting substrate 1.

As illustrated in FIG. 5, using the additive, the base body 6 with the groove was adhered to the Si substrate 1 so as to face a surface having formed the groove thereon to the adhering surface side. After the adhering, the base body 6 was polished up to a thickness of 6 μm (see FIG. 6). Thus, a mirror that reflects light by the end of the optical waveguide in the direction perpendicular to the substrate was formed.

The above substrate was end face-polished, and a 1.55 μm single mode fiber was connected to the end face of the optical waveguide. As a result of measuring the amount of light taken out onto the upper surface by the reflecting mirror 14A of the optical waveguide end, the reflection loss at the reflecting mirror 14A was 5% or less. Further, as a result of attaching the light receiving element 5 to the upper surface of the substrate, incident light was successfully received to convert the incident light to the amplitude of an electric signal.

Although the foregoing description has been made on particular embodiments of the present invention, the invention is not limited thereto and various changes and modification may be made without departing from the spirit and scope of the appended claims.

The invention claimed is:

1. A method for manufacturing an optical surface mounting waveguide substrate, the method comprising the steps of:
   an optical waveguide forming step for forming an optical waveguide in a base body;
   a cladding layer forming step for providing a cladding layer on the base body;
   a groove forming step for forming a groove in the base body and the cladding layer;
   a bonding step for bonding the base body and the cladding layer to a supporting substrate with the cladding layer positioned on the supporting substrate side; and
   a thinning step for machining and thinning the base body to form a thin plate so that the groove penetrates through the thin plate,
   wherein an end face of the optical waveguide on the groove side is contacted with a light absorbing material or light reflecting material to form a reflecting mirror.

2. The method of claim 1, wherein the groove has a first inclined surface inclined with respect to a vertical plane to one direction and a second inclined surface inclined with respect to the vertical plane to a direction opposite to the one direction.

3. The method of claim 1, wherein the light reflecting material or the light absorbing material forms a film covering the end face.

4. The method of claim 3, wherein the groove is filled with a low dielectric constant material.

5. The method of claim 3, wherein the groove comprises a void.

6. The method of claim 1, wherein the groove is filled with the light reflecting material or the light absorbing material.

7. The method of claim 2, wherein the light reflecting material or the light absorbing material forms a film covering the end face.

8. The method of claim 2, wherein the groove is filled with the light reflecting material or the light absorbing material.

* * * * *